(12) United States Patent
Sprenger et al.

(10) Patent No.: US 12,057,794 B2
(45) Date of Patent: Aug. 6, 2024

(54) CONTROL DEVICE AND CONTROL METHOD FOR AN ELECTRIC DRIVE SYSTEM, AND ELECTRIC DRIVE SYSTEM

(71) Applicant: Robert Bosch GmbH, Stuttgart (DE)

(72) Inventors: Helge Sprenger, Kornwestheim (DE); Thomas Zeltwanger, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 17/924,822

(22) PCT Filed: Apr. 30, 2021

(86) PCT No.: PCT/EP2021/061403
§ 371 (c)(1),
(2) Date: Nov. 11, 2022

(87) PCT Pub. No.: WO2021/228582
PCT Pub. Date: Nov. 18, 2021

(65) Prior Publication Data
US 2023/0268861 A1    Aug. 24, 2023

(30) Foreign Application Priority Data

May 12, 2020   (DE) .................. 10 2020 205 915.2

(51) Int. Cl.
*H02P 23/28*    (2016.01)
*B60L 15/20*    (2006.01)
(Continued)

(52) U.S. Cl.
CPC .............. *H02P 23/28* (2016.02); *B60L 15/20* (2013.01); *B60L 53/20* (2019.02); *H02P 27/085* (2013.01)

(58) Field of Classification Search
CPC .......... H02P 23/28; H02P 27/085; H02P 6/08; H02P 6/10; H02P 6/12; H02P 6/14; H02P 21/00; H02P 21/18; H02P 23/07; H02P 21/20; H02P 21/30; H02P 25/024; H02P 25/064; H02P 25/098; H02P 21/22; H02P 27/08; H02P 11/06; H02P 21/0021; H02P 27/06; H02P 2201/09; H02P 2207/05;
(Continued)

(56) References Cited

U.S. PATENT DOCUMENTS

| 2014/0103843 A1 | 4/2014 | Bae et al. |
| 2015/0115865 A1* | 4/2015 | Matsuda ................. H02P 1/029 |
| | | 318/808 |
| 2018/0076744 A1 | 3/2018 | Wolf et al. |

FOREIGN PATENT DOCUMENTS

| DE | 102017203668 A1 | 9/2018 |
| JP | H0315204 A | 1/1991 |

(Continued)

OTHER PUBLICATIONS

Translation of International Search Report for Application No. PCT/EP2021/061403 dated Aug. 11, 2021 (2 pages).

*Primary Examiner* — Antony M Paul
(74) *Attorney, Agent, or Firm* — Michael Best & Friedrich LLP

(57) ABSTRACT

The invention relates to controlling an electric drive system, a control range for the switching frequency of a power converter in such a drive system being adaptable when the rotational frequency curve or the torque curve of the electrical machine is taken into account. In this way, psychoacoustic irritations can be avoided.

10 Claims, 3 Drawing Sheets

(51) Int. Cl.
*B60L 53/20* (2019.01)
*H02P 27/08* (2006.01)

(58) Field of Classification Search
CPC .......... H02P 23/14; H02P 25/022; H02P 7/06;
H02P 21/14; H02P 2205/05; H02P 25/03;
H02P 9/302; H02P 6/17; B60L 53/20;
B60L 15/20; B60L 6/06; B60L 2240/421;
B60L 15/025; B60L 2220/14; B60L
2200/26; B60L 2210/40; B60L 2220/12;
B60L 9/22; B60L 2240/423; B60L
2240/429; B60L 2240/42; B60L 2220/16
See application file for complete search history.

(56) References Cited

FOREIGN PATENT DOCUMENTS

| | | |
|---|---|---|
| JP | 2005130614 A | 5/2005 |
| JP | 2008301656 A | 12/2008 |
| JP | 2011109883 A | 6/2011 |

\* cited by examiner

CONTROL DEVICE AND CONTROL METHOD FOR AN ELECTRIC DRIVE SYSTEM, AND ELECTRIC DRIVE SYSTEM

BACKGROUND OF THE INVENTION

The present invention relates to a device and a method for controlling an electric drive system. The present invention furthermore relates to an electric drive system.

Electric drive systems are used, for example, in fully or at least partially electrically driven vehicles. In this case, electrical energy is provided by a so-called traction battery and converted by means of an electric power converter into an alternating voltage which is suitable for operating the electrical machine according to the desired setpoint specifications.

Publication DE 10 2017 203 668 A1 describes a method and a device for operating an inverter for a drive system. The method presented here comprises a step for determining a switching frequency for the inverter using a working point signal. The method furthermore comprises a step for providing a frequency signal in order to set a specified switching frequency at the inverter.

SUMMARY OF THE INVENTION

The present invention provides a control device and a method for controlling an electric drive system as well as an electric drive system.

Accordingly, the following is provided:

A control device for an electric drive system, in particular an electric drive system comprising a power converter and an electrical machine. The control device comprises a monitoring unit and a control unit. The monitoring unit is designed to determine a rotational frequency of the electrical machine. Additionally or alternatively, the monitoring unit may determine a torque of the electrical machine. Furthermore, the monitoring unit is designed to determine a variation of the determined rotational frequency and/or of the determined torque. The control unit is designed to define a control range for a switching frequency of the power converter. The control range can be defined in particular using the variation of the rotational frequency or of the torque determined by the monitoring unit. Furthermore, the control unit is designed to control the power converter with a switching frequency in the defined control range.

The following is furthermore provided:

An electric drive system comprising an electrical machine, a power converter designed to control the electrical machine, and a control unit according to the invention.

Finally, the following is provided:

A method for controlling an electric drive system, in particular an electric drive system comprising a power converter and an electrical machine. The method comprises a step for determining a current rotational frequency and/or a current torque of the electrical machine. Furthermore, the method comprises a step for determining a variation of the determined rotational frequency and/or of the determined torque. Furthermore, the method comprises a step for defining a control range for a switching frequency of the power converter. In particular, the control range for the switching frequency of the power converter can be defined using the variation of the rotational frequency and/or the variation of the torque. Finally, the method comprises a step for controlling the power converter with a switching frequency in the defined control range.

Advantages of the Invention

The present invention is based on the finding that an electric drive system generally comprises a power converter which includes switching elements that are controlled at a specified switching frequency. This switching frequency leads to a specific noise generation in the electric drive system. In particular, in modern electric drive systems, the switching frequency can be varied for controlling the switching elements. This variation of the switching frequency influences a plurality of operating properties of the electric drive system. For example, the selection of the switching frequency impairs the electrical losses within the drive system or also a possibly occurring voltage ripple at the input of the power converter. In addition, the selection of the switching frequency also influences the acoustic properties and the noise emission of the electric drive system. The noise emission that occurs can be perceived in particular by people in the surroundings of the drive system, such as the vehicle driver of an electric vehicle.

Depending on the current driving situation, a vehicle driver will generally expect a noise typical of this driving situation. For example, during an acceleration process, the vehicle driver will expect a noise of an increasing or at least constant frequency, while a noise of a decreasing frequency could rather be perceived as irritating during an acceleration process. Conversely, in the event of a deceleration of the vehicle, the vehicle driver will rather expect a noise of a decreasing or at least constant frequency, while noise generation at increasing frequency during a deceleration process could lead to irritations.

It is therefore a concept of the present invention to take into account this finding and to suitably adapt the switching frequency for controlling switching elements in a power converter for an electric drive system on the basis of the respective operating properties. In particular, the switching frequency for controlling a power converter should suitably take into account the operating behavior of the electric drive system, such as variations in the rotational speed or in the torque. In this way, a noise generation of the electric drive system corresponding to the switching frequency is likewise adapted according to the operating behavior, such as the variation of the rotational frequency or of the torque. Noise generation of the electric drive system that leads to a positive psycho-acoustic perception can thus be achieved. For example, a vehicle driver of an electric vehicle perceives a noise generation that corresponds to the driving behavior of the vehicle. In particular, irritations of the vehicle driver can thereby be avoided.

The electric drive system comprising a control device according to the invention may, for example, be a drive system of a fully or at least partially electrically driven vehicle. For example, such a drive system can be supplied with direct voltage from an electrical energy store, such as a traction battery. In this case, the power converter can convert the direct voltage provided by the energy store into a suitable single-phase or multi-phase alternating voltage and can provide this alternating voltage at the electrical machine. In this case, the power converter can take into account, in particular, setpoint specifications, such as a rotational frequency of the electrical machine to be set or a torque to be provided. In addition, the power converter may of course also take into account any further setpoint specifications in order to provide a corresponding suitable voltage at the electrical machine.

The electric power converter may comprise, for example, one or more half-bridges each comprising two switching elements, which are controlled and thus opened or closed according to the setpoint specifications. The switching elements may, for example, be bipolar transistors comprising an isolated gate terminal (IGBT) or also MOSFET switching elements. In particular, modern transistors based on silicon carbide (SiC) may be used in a wide frequency range for the switching frequency. In this case, switching frequencies in a range between 5 and 40 kHz are possible, for example.

The control unit of the control device according to the invention can thus suitably adapt the switching frequency for controlling the switching elements in the power converter according to the current framework conditions. For example, the control frequency may be controlled in such a way that the losses in the electric drive system are minimized, disruptive effects, such as a voltage ripple at the input of the voltage converter, are kept below a specified limit value, or any further framework conditions are met. For this purpose, a control range for the switching frequency can be specified on the basis of the current curve of the rotational motor speed or of the motor torque. In this way, the noise generation of the electric drive system can be influenced. In particular, psycho-acoustic impairments, which could lead to an irritation of a user, can be avoided or at least minimized, for example.

According to one embodiment, the monitoring unit can be designed to be calculated the variation of the rotational frequency using a gradient of the currently detected rotational frequency curve. Additionally or alternatively, the variation of the torque may also be calculated using a gradient of the currently detected torque curve. A gradient generally corresponds to a first derivative of the function over time. In addition, any further suitable calculation methods, e.g., a calculation of a second derivative over time, or the like, are also possible in principle.

According to one embodiment, the monitoring unit is designed to detect the current rotational frequency on the basis of measured values. Additionally or alternatively, the torque may also be detected on the basis of measured values of a current actual torque. In addition or as an alternative to a detection of the actual values, the monitoring may also receive setpoints for the rotational frequency and/or the torque. Accordingly, the control range for the switching frequency can thus be specified on the basis of current actual values and/or setpoint specifications.

According to one embodiment, the control unit is designed to define a current switching frequency as the lower limit frequency of the control range for the switching frequency if the rotational frequency and/or the torque are increased. Additionally or alternatively, the control unit may define the current switching frequency as the upper limit frequency of the control range for the switching frequency if the rotational frequency and/or the torque are reduced. Optionally, the lower or the upper limit frequency for the control range may deviate by a specified threshold value from the current switching frequency. For example, the lower frequency may be lower by a specified threshold value than the current limit frequency if the rotational frequency is increased. Accordingly, a frequency that is higher by a specified threshold value than the current switching frequency may be used as the upper limit frequency if the rotational frequency is reduced. In this way, it can be ensured that the noise generation of the electric drive system, in particular the frequency of the noise generation, changes in accordance with the dynamic behavior of the drive system.

According to one embodiment, the control unit is designed to define a predetermined maximum switching frequency as the upper limit frequency of the control range for the switching frequency if the rotational frequency and/or the torque are increased. Additionally or alternatively, a predetermined minimum switching frequency may be defined as the lower limit frequency of the control range for the switching frequency if the rotational frequency and/or the torque are reduced. In this way, the control range for the switching frequency can be exhausted within wide ranges in the case of a variation of the rotational frequency, without resulting in psycho-acoustic impairments for a user.

According to one embodiment, the control unit is designed to adapt a modulation method for controlling the power converter using the determined rotational frequency and/or the determined torque. In addition to conventional pulse width modulation (PWM), in particular SVPWM, further specific modulation methods, such as block operation, flat-top modulation, or the like, may be used as a possible modulation method. In this case, the current rotational frequency or the current torque as well as the current variation of rotational frequency or torque can also be taken into account in the selection of the modulation method used.

According to one embodiment, the control device comprises a characteristic curve memory. The characteristic curve memory may be designed to store and provide at least one characteristic curve that is suitable for controlling the power converter. The control unit may in particular be designed to control the power converter using the characteristic curve stored in the characteristic curve memory. The characteristic curves can represent any suitable relationships of operating parameters and/or setpoints. For example, the characteristic curves stored in the characteristic curve memory can represent, for example, relationships previously determined by measurement technology or on the basis of simulations, for example electrical losses, such as switching losses in the semiconductor switching elements, losses of the electrical machine, voltage ripples to be expected, temperature profiles, or the like. However, it is understood that any other relationships may also be stored in the characteristic curve memories.

According to one embodiment, the control unit is designed to adapt the control of the power converter using at least one further operating parameter. The at least one further operating parameter may, for example, be a voltage ripple, determined by measurement technology or on the basis of simulations, at the input of the power converter. Furthermore, for example, temperatures or temperature profiles of the drive system determined by measurement technology or mathematically, for example in the rotor of the electrical machine or at the switching elements of the power converter, may also be taken into account. In addition, any other operating parameters which may be considered for controlling the power converter are of course also possible.

The described embodiments and developments may be combined with one another as desired, where appropriate. Further embodiments, developments, and implementations of the invention also include combinations of features of the invention described above or below that have not been explicitly mentioned with respect to the exemplary embodiments. In particular, a person skilled in the art will also add individual aspects as improvements or additions to the relevant basic form of the present invention.

BRIEF DESCRIPTION OF THE DRAWINGS

The present invention is explained in more detail below with reference to the exemplary embodiments indicated in schematic figures of the drawings, in which.

DETAILED DESCRIPTION

Figure 1:
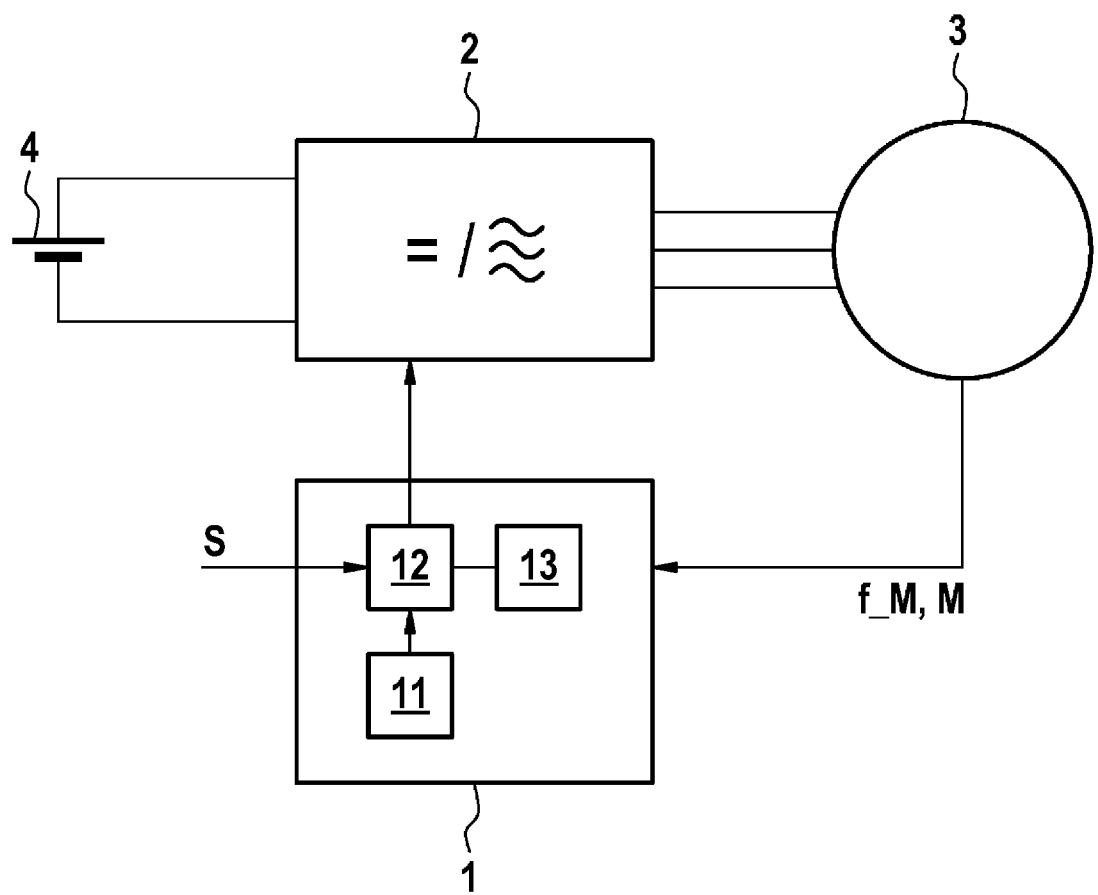
FIG. 1: shows a schematic representation of a block diagram of an electric drive system comprising a control device according to one embodiment.

FIG. 1 shows a schematic representation of a block diagram of an electric drive system according to one embodiment. The electric drive system comprises an electrical machine 3. The electrical machine 3 can be supplied by a power converter, in particular a single-phase or multi-phase inverter 2. The power converter 2 is supplied on the input side by an electrical energy source 4, in particular by an electrical energy store, such as the traction battery of an electric vehicle. The power converter 2 converts the electrical energy provided by the electrical energy source 4 into an electrical voltage which is suitable for setting a desired operating state at the electrical machine 3, e.g., a desired rotational frequency or a desired torque. For this purpose, the power converter 2 may comprise a plurality of switching elements, in particular semiconductor switching elements, such as bipolar transistors comprising an isolated gate terminal (IGBT) or silicon carbide transistors or the like. The switching elements of the power converter 2 may be opened and closed by means of suitable control signals. For this purpose, the individual switching elements of the power converter 2 may be controlled by means of corresponding control signals. These control signals may be provided by the control device 1, for example. In particular, the control signals may be generated at a predetermined clock frequency. In particular, the semiconductor switching elements may be controlled by means of pulse width modulation (PWM). The specifications for setting a particular operating state, such as rotational frequency or torque, may be provided, for example, by means of corresponding setpoint specifications S at the control device 1.

Furthermore, the control device 1 may detect the current rotational frequency f_M of the electrical machine 3 and/or the torque M currently provided by the electrical machine 3. For this purpose, suitable sensor devices, such as a resolver or the like, may be provided, for example. However, it is understood that the current rotational frequency f_M or the torque M may also be detected in any other way. For example, methods for determining the rotational frequency f_M without sensors are also possible.

The control device 1 may comprise a monitoring unit 11 which receives the setpoint specifications S and optionally the signals of the current rotational frequency f_M and/or of the current torque M of the electrical machine 3. In particular, the monitoring unit 11 can monitor the curve of the rotational frequency f_M or of the torque M of the electrical machine 3 and detect variations or changes of the rotational frequency f_M or of the torque M. For this purpose, a gradient, i.e., a first derivative over time, for example, or optionally also any other suitable variable, such as a second derivative of the values over time or the like, may be calculated. For this purpose, the actual values for rotational frequency f_M or torque M may, for example, be detected and stored for a predetermined period of time. For example, the values may be stored in a cyclic memory. For example, the cyclic memory may store a predetermined number of measured values. After the predetermined number of measured values has been written into the memory, the next following value overwrites the oldest previously stored value. Of course, any other suitable methods for storing the values or for determining a variation in the rotational frequency f_M or in the torque M are also possible.

In addition to the consideration of the actual values for rotational frequency f_M or torque M of the electrical machine 3, setpoint specifications for rotational frequency or torque may also be considered additionally or alternatively.

The monitoring unit 11 provides the determined data, i.e., the detected values for rotational frequency f_M or torque M, and in particular the results of the analysis with respect to the variation of rotational frequency f_M or torque M at the control unit 12 of the control device 1. On the basis of the data provided by the monitoring unit 11, the control unit 12 can define a control range for a possible switching frequency for controlling the switching elements in the power converter 2. In this case, the control unit 12 can, for example, limit the control range for the switching frequency in such a way that a reduction of the switching frequency is avoided when the rotational frequency f_M is increased. Analogously, when the rotational frequency f_M is lowered at the electrical machine 3, an increase in the switching frequency by correspondingly adapting the control range for the switching frequency an increase can be avoided. In this way, it can be prevented that the frequency components of noise generation of the electric drive system behave oppositely to a change in rotational speed of the electrical machine.

The control unit 12 can thereupon suitably control the voltage converter 2 and, in particular, the switching elements in the voltage converter 2, taking into account the defined control range for the switching frequency. For this purpose, the control unit 12 may, for example, in particular, resort to possible characteristic curves or characteristic curve sets stored in a characteristic curve memory 13 of the control device 1. These characteristic curves or characteristic curve sets may, for example, characterize electrical losses on the basis of the switching frequency, a potential or expected voltage ripple at the input of the voltage converter 2 on the basis of further operating parameters or temperature profiles on the basis of further operating parameters, etc.

Figure 2:
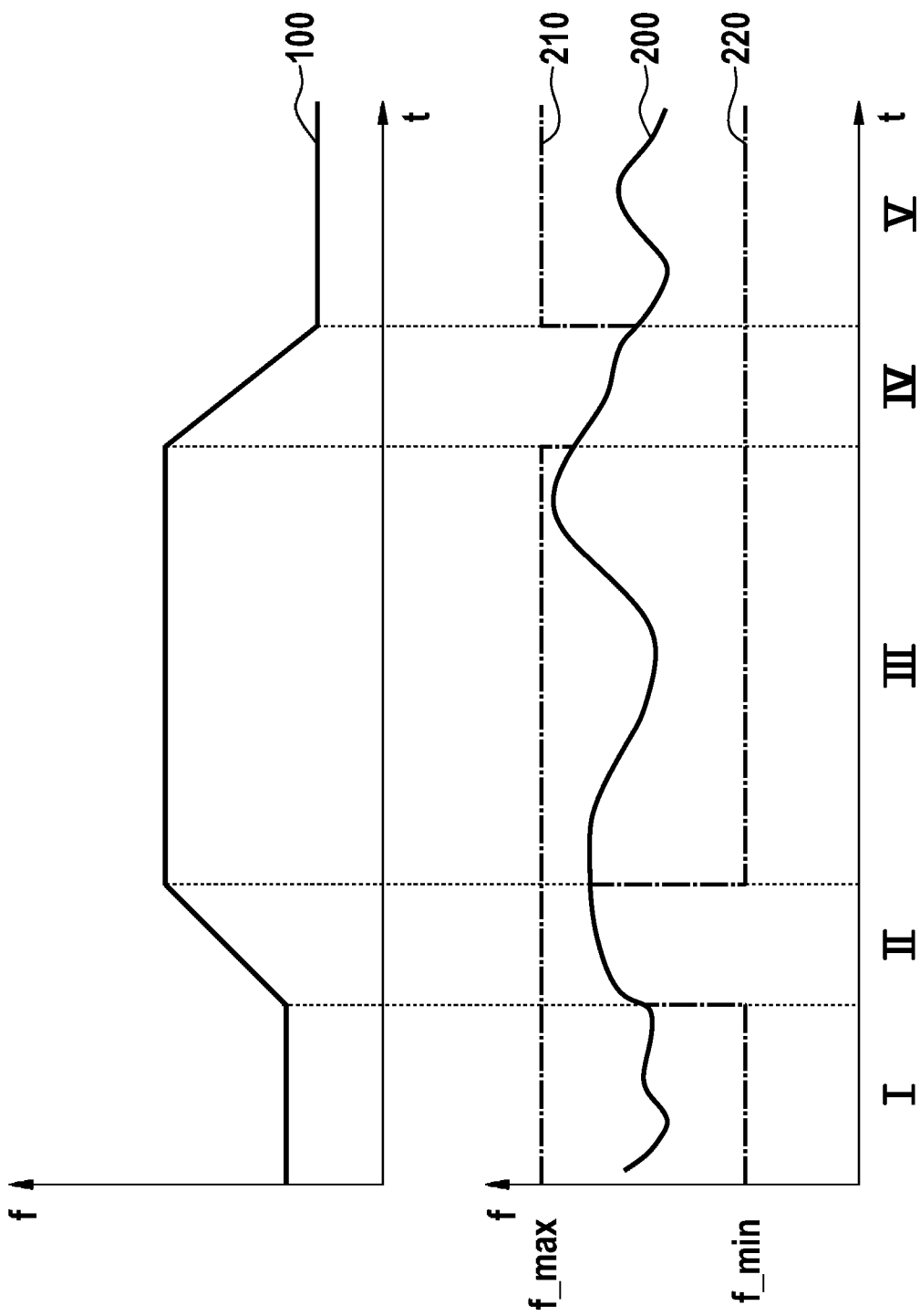
FIG. 2: shows a schematic representation for adapting the control range for the switching frequency according to one embodiment.

FIG. 2 shows a schematic representation for adapting the control range for the switching frequency according to one embodiment. The curve profile 100 represents the current desired rotational speed or the current actual rotational speed of the electrical machine 3. As can be seen here, the electrical machine 3 is operated in the first time segment I, the third time segment III, and the fifth time segment V in each case at a constant or at least approximately constant rotational speed. In the second time segment II, the rotational speed f_M of the electrical machine 3 is increased. In the fourth time segment IV, the rotational speed f_M of the electrical machine 3 is reduced.

In the diagram shown below, the control range of the switching frequency for the switching elements of the voltage converter 2 is shown. The curve profile 200 represents the current switching frequency in each case. The upper curve profile 210 illustrates the upper limit frequency of the control range for the switching frequency, and the lower curve profile 220 illustrates the lower limit frequency of the control range for the switching frequency.

In the first time segment I, in which the electrical machine 3 rotates at an approximately constant rotational speed, the switching frequency can be varied, e.g., completely, between a minimum switching frequency f_min and a maximum switching frequency f_max. After it has been determined that the rotational speed f_M of the electrical machine 3 increases or is to increase, this control range is restricted in time segment II. For example, the lower limit of the control range for the switching frequency may be limited to the current switching frequency. Thus, only a range between the current switching frequency and the maximum permissible switching frequency f_max is still available as a control range for the switching frequency. In this way, it can be avoided that when the rotational frequency f_M of the electrical machine 3 is increased, the switching frequency is reduced and a noise generation that would be acoustically opposed to the behavior of the electrical machine 3 is thus produced.

After it has been determined in segment III that the rotational frequency f_M of the electrical machine 3 is again constant or at least approximately constant, the control range for the switching frequency can be extended. For example, in this phase, the switching frequency may again be varied completely between the minimum switching frequency f_min and the maximum switching frequency f_max.

If it is thereupon detected in time segment IV that the rotational frequency f_M of the electrical machine 3 is reduced, the control range for the switching frequency can thereupon also be correspondingly restricted. For example, in this case, the current switching frequency may be stipulated as the maximum permissible switching frequency. The switching frequency thus can only move between the current switching frequency and the minimum permissible switching frequency f_min while the rotational frequency f_M decreases. After it has thereupon been determined again in segment V that the rotational frequency f_M of the electrical machine 3 is again constant or at least approximately constant, the control range may again be extended to the full control range between the minimum switching frequency f_min and the maximum switching frequency f_max.

In addition to the above-described restrictions of the switching frequency taking into account the rotational frequency or the torque of the electrical machine 3, any further operating parameters may additionally also be taken into account. In particular, these further operating parameters may also specify, for example, further restrictions for the control range of the switching frequencies. For example, for limiting a voltage ripple at the input of the voltage converter 2, a suitable restriction of the switching frequency for the voltage converter 2 may likewise be necessary. In addition, the selection of the switching frequency also corresponds to switching losses in the switching elements of the voltage converter 2 and to further losses in the electrical machine 3. This may also optionally lead to further restrictions for the control range of the switching frequency. Possible temperature effects, such as heating of the rotor of the electrical machine 3, may also optionally require further restrictions for the control range of the switching frequency. Of course, any further operating parameters may also be taken into account in order to adapt the control range for the switching frequency accordingly.

Figure 3:
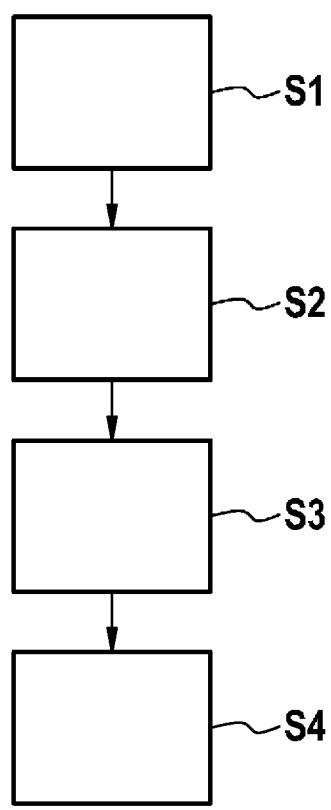
FIG. 3: shows a flowchart as underlying a method for controlling an electric drive system according to one embodiment.

FIG. 3 shows a schematic representation of a flowchart, as underlying a method for controlling an electric drive system according to one embodiment. The method may in principle comprise any steps as already described above in connection with the electric drive system. Accordingly, the electric drive system may also comprise any components as described below in connection with the control method.

In step S1, a current rotational frequency and/or a current torque of an electrical machine can first be determined. In step S2, a variation of the determined rotational frequency and/or of the determined torque can thereupon be determined. A control range for a switching frequency of a power converter can then be defined in step S3. In particular, the control range for the switching frequency can be defined using the variation of the rotational frequency and/or the variation of the torque. On the basis of this control range, the power converter can be controlled in step S4, wherein the switching frequency can be set within the previously defined control range.

In summary, the present invention relates to controlling an electric drive system, wherein a control range for the switching frequency of a power converter in such a drive system can be adapted taking into account the curve of the rotational frequency or of the torque of the electrical machine. In this way, psycho-acoustic irritations can be avoided.

The invention claimed is:

1. A control device (1) for an electric drive system comprising a power converter (2) and an electrical machine (3), the control device (1) comprising:
a monitoring unit (11) designed to determine a rotational frequency and/or a torque of the electrical machine (3), and to determine a variation of the determined rotational frequency and/or of the determined torque; and
a control unit (12) configured to define a control range for a switching frequency of the power converter (2) using the variation of the rotational frequency and/or the variation of the torque, and to control the power converter (2) with a switching frequency in the defined control range.

2. The control device (1) according to claim 1, wherein the monitoring unit (11) is configured to calculate the variation of the rotational frequency and/or of the torque using a gradient of the rotational frequency and/or of the torque.

3. The control device (1) according to claim 1, wherein the monitoring unit (11) is configured to detect a current actual rotational frequency and/or a current actual torque, and/or to receive a desired rotational frequency and/or a desired torque.

4. Control The control device (1) according to claim 1, wherein the control unit (12) is configured to define a current switching frequency as the lower limit frequency of the control range for the switching frequency if the rotational frequency and/or the torque increases, and/or to define the current switching frequency as the upper limit frequency of the control range for the switching frequency if the rotational frequency and/or the torque decreases.

5. The control device (1) according to claim 1, wherein the control unit (12) is configured to define a predetermined maximum switching frequency as the upper limit frequency of the control range for the switching frequency if the rotational frequency and/or the torque increases, and/or to define a predetermined minimum switching frequency as the lower limit frequency of the control range for the switching frequency if the rotational frequency and/or the torque decreases.

6. The control device (1) according to claim 1, wherein the control unit (12) is configured to adapt a modulation method for controlling the power converter (2) using the determined rotational frequency and/or the determined torque.

7. The control device (1) according to claim 1, further comprising a characteristic curve memory (13) which is configured to store and provide at least one characteristic curve for controlling the power converter (2), wherein the control unit (12) is designed to control the power converter (2) using the characteristic curve stored in the characteristic curve memory.

8. The control device (1) according to claim 1, wherein the control unit (12) is configured to adapt the control of the power converter (2) using at least one further operating parameter.

9. An electric drive system comprising:
an electrical machine (3);
a power converter (2) designed to control the electrical machine (3); and
a control unit (1) configured
determine a current rotational frequency and/or a current torque of the electrical machine (3);
determine a variation of the determined rotational frequency and/or of the determined torque;
define a control range for a switching frequency of the power converter (2) using the variation of the rotational frequency and/or the variation of the torque; and
control the power converter (2) with a switching frequency in the defined control range.

10. A method for controlling an electric drive system comprising a power converter (2) and an electrical machine (3), comprising the steps of:
determining (S1) a current rotational frequency and/or a current torque of the electrical machine (3);
determining (S2) a variation of the determined rotational frequency and/or of the determined torque;
defining (S3) a control range for a switching frequency of the power converter (2) using the variation of the rotational frequency and/or the variation of the torque; and
controlling (S4) the power converter (2) with a switching frequency in the defined control range.

* * * * *